United States Patent
Neumann et al.

(10) Patent No.: US 8,295,807 B2
(45) Date of Patent: Oct. 23, 2012

(54) PERSONALISING A SIM BY MEANS OF A UNIQUE PERSONALIZED MASTER SIM

(75) Inventors: Peter Neumann, Munich (DE); Giulio Leopoldo Pagano, Vienna (AT)

(73) Assignee: Deutsche Telekom AG, Bonn (DE)

( * ) Notice: Subject to any disclaimer, the term of this patent is extended or adjusted under 35 U.S.C. 154(b) by 36 days.

(21) Appl. No.: 12/933,760

(22) PCT Filed: Apr. 20, 2009

(86) PCT No.: PCT/EP2009/002862
§ 371 (c)(1),
(2), (4) Date: Nov. 24, 2010

(87) PCT Pub. No.: WO2009/149788
PCT Pub. Date: Dec. 17, 2009

(65) Prior Publication Data
US 2011/0059773 A1    Mar. 10, 2011

(30) Foreign Application Priority Data

May 29, 2008   (DE) .................... 10 2008 025 792

(51) Int. Cl.
*H04M 1/66* (2006.01)
*H04K 3/00* (2006.01)
(52) U.S. Cl. ........................ 455/410; 455/558
(58) Field of Classification Search .......... 455/410–411, 455/558
See application file for complete search history.

(56) References Cited

U.S. PATENT DOCUMENTS

| | | | |
|---|---|---|---|
| 6,466,804 B1 * | 10/2002 | Pecen et al. .................... | 455/558 |
| 6,868,282 B2 | 3/2005 | Carlsson | |
| 7,603,107 B2 | 10/2009 | Ratert et al. | |
| 7,689,254 B2 | 3/2010 | Tanneberger et al. | |
| 2001/0041592 A1 | 11/2001 | Suonpera et al. | |
| 2004/0042442 A1 * | 3/2004 | Pecen et al. .................... | 370/352 |
| 2004/0176071 A1 | 9/2004 | Gehrmann et al. | |
| 2005/0255885 A1 | 11/2005 | Majewski et al. | |
| 2006/0148533 A1 | 7/2006 | Tanneberger et al. | |
| 2006/0154659 A1 | 7/2006 | Roter et al. | |
| 2006/0155650 A1 | 7/2006 | Oh et al. | |
| 2007/0004457 A1 | 1/2007 | Han | |
| 2008/0003982 A1 | 1/2008 | Gushiken | |
| 2008/0109656 A1 | 5/2008 | Kotzin | |
| 2009/0055922 A1 | 2/2009 | Kotzin | |
| 2010/0029200 A1 | 2/2010 | Varriale et al. | |

FOREIGN PATENT DOCUMENTS

| | | | |
|---|---|---|---|
| DE | 4406472 A | | 9/1995 |
| DE | 102004014419 A | | 12/2004 |
| GB | 2294787 A | | 8/1996 |
| GB | 2365699 A | | 6/2003 |
| GB | 2442565 A | | 9/2008 |
| WO | 00/31994 A | | 7/2000 |
| WO | 2005/119931 A | | 12/2005 |

* cited by examiner

*Primary Examiner* — Lee Nguyen
(74) *Attorney, Agent, or Firm* — Andrew Wilford

(57) ABSTRACT

Method for starting up and personalising a further second non-personalised identification module (VSIM), in particular for operation of a mobile radio terminal, wherein a first identification module MasterSIM (MSIM) containing a personalised user data set is present, characterized in that an authentication and/or checking of the second identification module (VSIM) is carried out and the user data set for storage on the second identification module (VSIM) for personalising the second identification module (VSIM) is read from the MasterSIM (MSIM), transmitted to the second identification module (VSIM) and stored therein, in particular containing one or more unique definitive user identification (IMSI).

15 Claims, 1 Drawing Sheet

PERSONALISING A SIM BY MEANS OF A UNIQUE PERSONALIZED MASTER SIM

CROSS REFERENCE TO RELATED APPLICATIONS

This application is the US-national stage of PCT application PCT/EP2009/002862, filed 20 Apr. 2009, published 17 Dec. 2009 as 2009/149788, and claiming the priority of German patent application 102008025792.3 itself filed 29 May 2008, whose entire disclosures are herewith incorporated by reference.

FIELD OF THE INVENTION

The invention relates to a method of starting up and personalizing a second nonpersonalized identification module, in particular a SIM (subscriber identity module) for operation of a mobile radio terminal, using a first identification module MasterSIM containing a personalized user data set.

BACKGROUND OF THE INVENTION

Chip cards are in particular used in mobile radio telecommunications such as, in particular, in the cellular mobile radio networks according to the GSM or the UMTS standard for unique and secure identification of the subscribers as well as for the provision of different special functions and value-added services. The chip cards that, depending on the underlying generation and type of system standard, are designated as UICC, SIM, USIM, R-UIM or also ISIM, carry a plurality of special parameters, secret codes and further elements of various kinds, for example with operator data, provider data, product data, or subscriber data. In summary, these chip cards and chip card applications are designated as subscriber identification module or as SIM (subscriber identity module).

Further fields of use of chip cards are credit cards, debit cards or other identification modules, in particular including storage chips on which a readable, individual, personalized data set is stored.

If hereinafter a subscriber data set, subscriber identity module or the like is mentioned, this means generally in each case a data set, or identification module or the like without limitation of the use of the invention to the field of mobile radio technology. The field of mobile radio technology and in particular use of the invention for personalizing subscriber identity modules of mobile radio subscribers for operation of mobile radio terminals is only a preferred field of use in which the invention can be used in a particularly advantageous manner. However, the invention is not limited to this field.

For starting up a mobile terminal and the subscription of the mobile radio service, a subscriber identity module (SIM) is to be equipped with a subscriber data set that includes in particular the subscriber identification (IMSI). Today, such subscriber identity modules (SIM) are equipped in the run-up on the part of the mobile radio network operator with the appropriate data to be able to identify the user during use of a mobile radio network. A nonpersonalized SIM is not suited for use in a mobile radio terminal, i.e. the use of the services of a mobile radio network with a nonpersonalized SIM is not possible. The specific data that are required, on the one hand, for use of the services and, on the other, for billing the used services have to uniquely identify the user to prevent misuse.

A disadvantage is that for using a plurality of devices an increasing number of SIM cards is necessary. Thus, a plurality of SIM cards have to be assigned to one user, or the user has to switch the SIM card among the devices to operate different mobile radio terminals, which is very complicated and inconvenient.

Currently the situation is such that new SIM cards can only be issued by the mobile radio network operator, which involves high effort and costs. In other fields the issuance of new chip cards is also restricted to the system operator.

OBJECT OF THE INVENTION

It is the object of the invention to provide a method of starting up and personalizing an identification module, in particular a subscriber identity module SIM for operation of a mobile radio terminal, which simplifies administration, production and use of personalized identity modules SIM.

SUMMARY OF THE INVENTION

It is particularly advantageous in the method according to the invention for starting up and personalizing a further second nonpersonalized identification module, in particular for operation of a mobile radio terminal, where a first identification module MasterSIM containing a personalized data set is provided, a second identification module is authenticated and/or checked, and the data set, in particular containing one or more unique definitive subscriber identification (IMSI), to be stored on the second identification module for personalizing the second identification module is read from the first identification module MasterSIM, transmitted to the second identification module, and stored therein.

The designation second identification module means not only a second identification module, in particular SIM, per se, but any further identification module because with the method according to the invention, a plurality, i.e. depending on demand, any number of further identification modules can be personalized.

Thus, it is only necessary on the one hand to issue a personalized MasterSIM, i.e. an identification module or subscriber identification module containing a personalized data set/subscriber data set, where the MasterSIM is appropriately equipped and suitable to provide data, i.e. the personalized data set/subscriber data set, to make with the data set/subscriber data set, a second or any number of further identification modules, in particular further so-called SIM cards for operating further mobile radio terminals. Thus, in principle, the MasterSIM virtually generates copies of SIMs, in particular for operating mobile radio terminals, and MasterSIM and further SIM can differ from one another in particular in that, on the other hand, it is not possible to make a further copy from a further SIM, but that only the MasterSIM is suited to do this. This can be ensured in that the MasterSIM is equipped with a special authentication ability or property.

If within the context of this description, a subscriber data set, subscriber identity module or the like is mentioned, this means generally in each case data set, or identity module or the like, without limitation of the use of the invention to the field of mobile radio technology. The designation SIM which, as abbreviation of the English term "subscriber identity module," is well known and common, does not represent a limitation to the field of mobile communication. In fact, the abbreviation SIM or terms containing the abbreviation SIM is intended to cover any kind of identification module that has a retrievable or readable individual data set. The field of mobile radio technology and in particular the use of the invention for personalizing subscriber identity modules of mobile radio subscribers for operation of mobile radio terminals is only a preferred field of use in which the invention can be used in a particularly advantageous manner. However, the invention is not limited to this field.

This MasterSIM can then serve as template for all further future authentications for further SIM cards or mobile radio terminals with a permanently installed SIM, and the user himself can personalize one or more identification modules or subscriber identification modules SIM.

There is further the possibility that a first identification module MasterSIM (MSIM) contains a plurality of subscriber identifications (IMSI) that are used for starting up and personalizing a plurality of nonpersonalized identification modules (VSIM).

Preferably, an originally nonpersonalized identification module (VSIM) can be repersonalized several times after a first personalizing, either via the same original MasterSIM (MSIM) or with the same or a changed data set, or also via another MasterSIM (MSIM).

Preferably, it is also possible to change only portions of the data set on the personalized identification modules (VSIM), in particular that only the subscriber identifications (IMSI).

Here, the data set can be transmitted via a radio connection (for example OTA [over-the air]) or other connection to a read/write device receiving the second SIM or, alternatively, the data set can be transmitted within a read/write device receiving the MasterSIM as well as the second SIM.

To make the method more secure, preferably before personalizing and the transmitting the data set/subscriber data set from the MasterSIM, the serial number of the second SIM and/or the mobile radio terminal through which the mobile radio terminal is uniquely identifiable is checked and/or authenticated by the equipment identity number (IMEI) and/or security parameters of the second SIM are checked.

This ensures that only those nonpersonalized identification modules/subscriber identification modules are personalized that are intended for this to prevent misuse.

Furthermore, alternatively or in additional to the protection of the method, before personalizing and transmitting the data set/subscriber data set from the MasterSIM, the MasterSIM itself can be checked and/or authenticated.

as a result, the security of the method can be further increased, i.e. so it is not possible to make a copy of any SIM, i.e. for example, to make a copy of any subscriber identification module for a mobile radio network, but that this is in fact restricted to the so-called MasterSIMs.

It is thus preferably excluded to make a copy of each identification module/subscriber identification module SIM. With copy in this context is meant that a plurality of identification modules/subscriber modules SIM each have a respective individual serial number (ICCID), but apart from that, have an identical data set/subscriber data set for identification of the subscriber of the mobile radio network.

By use of a MasterSIM according to the invention, to personalize further identification modules, on the one hand, a MasterSIM of a parent generation is provided by means of which a plurality of direct offsprings or children can be generated, but it is preferably excluded to generate subscriber identification modules of a grandchildren generation because this is in each case exclusively possible by using the MasterSIM, but not by using any SIM and thus an offspring of the MasterSIM. Hereby, a very secure method of personalizing further subscriber identification modules SIM can be provided. Therefore, in this configuration, a second SIM can only be personalized by using a MasterSIM and not by any SIM as, in particular, an offspring of the MasterSIM.

Preferably, the serial number of the second SIM is stored in the MasterSIM, i.e. that preferably in each case a complete data base of all performed personalizations and serial numbers of the offsprings are stored in the MasterSIM. Preferably, alternatively or additionally, the date of a performed personalization of each further subscriber identification module SIM is stored in the MasterSIM.

Preferably, the data set/subscriber data set generated during personalizing and the associated user data or subscriber data, in particular the serial number (ICCID) of the second SIM, is stored in the home location register (HLR) of the mobile radio network. A unique allocation of the subscriber data to the respective user of the mobile radio network is thus ensured.

Preferably, the transmission of the serial number (ICCID) of the second SIM takes place via the MasterSIM to a home location register (HLR) of the mobile radio network, and the serial number of the second SIM then is stored therein. If the serial number of the second SIM is exclusively transmitted via the MasterSIM to the HLR, in fact a personalization of further SIMs is only possible via the MasterSIM because otherwise a registration of a further SIM in the home location register HLR of the mobile radio network is excluded. Hereby, a further increase of the security of the method is achieved and misuse is prevented.

Preferably, the data transmission of a data set/subscriber data set from the MasterSIM to the second SIM takes place via a secured data connection; in particular, the data transmission can take place encoded.

Preferably, after completed receipt and storage of the data set/subscriber data set on the second SIM, a confirmation is transmitted to the MasterSIM and/or to the mobile radio network, in particular the home location register HLR of the mobile radio network.

For starting up and personalizing a nonpersonalized identification module/SIM, the user, for example the subscriber in a mobile radio network has to acquire a MasterSIM (MSIM) only once, which MasterSIM contains a unique identification/subscriber identification with a personalized data set/subscriber data set and, furthermore, has appropriate authentication parameters for multiplication. The unique MasterSIM can then serve as template for multiplication for all future authentications and personalizations of further identification modules/subscriber identification modules SIM, independently of whether they are removable SIMs as cards or, for example, permanently installed SIMs in a mobile radio terminal.

In a preferred form of the method according to the invention, the first and/or the second identification module is a user identification module or a subscriber identification module for operating a mobile radio terminal.

Preferably, the data set is a subscriber data set of a mobile radio user.

BRIEF DESCRIPTION OF THE DRAWING

A possible use and configuration of the invention is illustrated below with reference to the figures. Therein.

DETAILED DESCRIPTION

An embodiment of the invention is shown with respect to mobile radio technology in which identification modules in the form of subscriber identification modules for operating a mobile radio terminal, so-called SIM cards, are used.

The MasterSIM MSIM is a first subscriber identification module MasterSIM MSIM that serves as template for all further subscriber identification modules VSIM to be personalized for the user of the mobile radio network. To this end, a predetermined number or any number of further nonpersonalized subscriber identification modules, i.e. virtual SIMs VSIM, can be personalized by using the MasterSIM MSIM.

To do this, a number of new and unused or even already used SIM cards or mobile radio terminals with integrated SIM cards are offered through any distribution channel. Initializing and personalizing is then carried out by the user by means of the unique MasterSIM MSIM.

A misuse of the virtual SIMs that are not yet personalized is excluded here because they are not capable of operating a mobile radio terminal without a previously performed personalization so that misuse is effectively prevented.

On the other hand, the MasterSIM does not have to be used by the user but can be securely stored, for example in a safe or other secure place because the MasterSIM does not have to be used for operating a mobile radio terminal but is only needed for personalizing further subscriber identification modules, i.e. virtual SIMs VSIM. Loss and potential misuse of the MasterSIM can thus effectively be prevented because only offspring SIMs VSIM have to be used for operating mobile radio terminals.

For starting up and personalizing a further second nonpersonalized subscriber identification module VSIM, the MasterSIM MSIM and the virtual SIM VSIM are connected to one another by a suitable technical interface. This can be a special device into which the SIM cards are placed. Alternatively, it is also possible that a radio connection between the MasterSIM MSIM and the further SIM VSIM to be personalized is established via a preferably secure connection.

The card to be initialized and personalized must preferably have a certain certificate so that checking and authorization by the MSIM is possible. This certificate is necessary to ensure secure operation and secure execution of the method and to safeguard private information, i.e. the subscriber data set of the MasterSIM MSIM prior to the transmission of the subscriber data set from the MasterSIM MSIM to the offspring VSIM, and to prevent misuse. For this, an initialization routine is carried out before the data are read from the MasterSIM MSIM and transmitted to the offspring VSIM by checking and authenticating the second SIM to be personalized and furthermore, on the other hand, by authenticating the MasterSIM.

Figure 1:
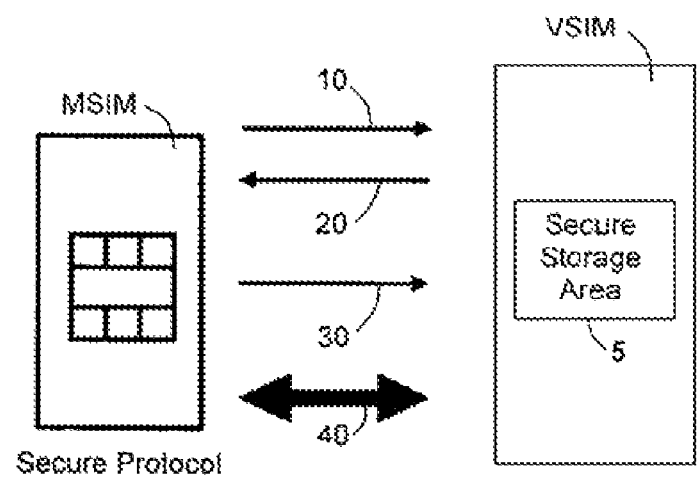
FIG. 1 shows a data transmission diagram from a MasterSIM MSIM to an offspring VSIM as further SIM.
Figure 2:
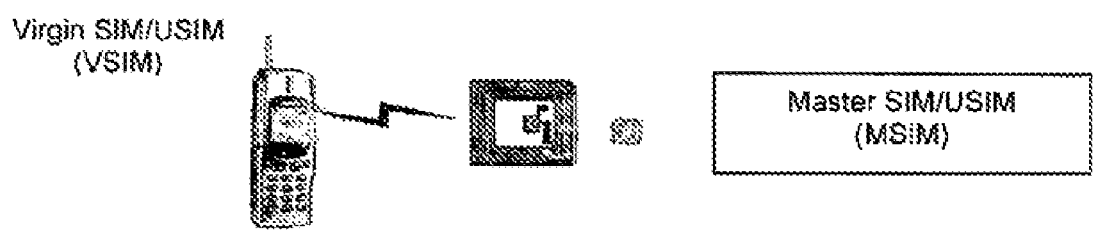
FIG. 2 shows a principle diagram of the data transmission from a MasterSIM MSIM via radio to a mobile radio terminal with an offspring VSIM.

It is also possible to check the serial number of the mobile radio terminal that receives the offspring VSIM, as schematically illustrated in the FIGS. 1 and 2.

It is also possible to check if the chip card VSIM to be initialized and personalized has already been in use or if this SIM card is new.

This also prevents misuse.

As illustrated in FIG. 1, a secure request 10 is addressed from the MasterSIM MSIM to the subscriber identification module VSIM to be initialized. Subsequently, the VSIM serial number 20 is transmitted back to the MasterSIM MSIM. After successful authentication and identification of the VSIM by checking the serial number 20, subsequently, the subscriber data 30 are transmitted from MasterSIM MSIM to the VSIM and are stored thereon in the storage chip 5. Communication 40 between MasterSIM MSIM and VSIM to be initialized and personalized is carried out via a secure connection.

As schematically illustrated in FIG. 2, it is also possible that communication is established via a secure radio connection to a mobile radio terminal that contains the SIM VSIM to be initialized. This too is a secure connection and the mobile radio terminal is equipped in such a manner that it can write the received individual subscriber data set on a SIM, i.e. to store the subscriber data set on the VSIM.

If the initialization routine has been successfully completed and the certificate has been identified as being valid, accordingly, as schematically illustrated in the FIGS. 1 and 2, the individual subscriber information, i.e., the individual subscriber data set is transmitted from the MasterSIM MSIM to the offspring VSIM to be initialized and personalized and is stored thereon. Conversely, the serial number of the VSIM is stored in the MasterSIM MSIM to be able at any time to reproduce the performed initializations, start-ups and personalizations of further SIMs by the MasterSIM.

If an offspring VSIM gets lost or is destroyed, its data can be used to disable such an offspring within the network from further use.

A repersonalized VSIM receives a combined identification number in the form of a network identification number containing, on the one hand, the equipment identification number (IMEI) and, furthermore, a secret number portion that originates from the MasterSIM MSIM. Thus, the serial number of the VSIM can be considered as public key combined with a secret key that is contained in the MasterSIM.

The MasterSIM is thus preferably equipped such that it has a preprogrammed field in which numbers used for personalizing can be stored. These fields must be kept secret and are transmitted to a VSIM only in a secure manner, reading or detecting the numbers being impossible because these numbers are used as the secret part of the VSIM key. Hereby, a unique use and allocation between MasterSIM MSIM and further subscriber identification modules VSIM personalized using the MasterSIM is possible.

After a successfully completed personalization, the VSIM can be installed in a mobile radio terminal and the use of this mobile radio terminal is then possible by using the personalized VSIM, i.e. identification of the subscriber is ensured through the VSIM and the VSIM's identity in the form of the serial number of the VSIM and the subscriber data set.

Thus, by using the MasterSIM MSIM, it is possible to produce a plurality of offsprings VSIMs and thus to use a plurality of mobile radio terminals also with identical subscriber identification.

The invention claimed is:

1. A method of starting up and personalizing a second nonpersonalized identification module, the method comprising the steps of
providing a first identification module,
storing on the first identification module a personalized data set containing one or more unique definitive subscriber identifications,
providing the second identification module,
authenticating or checking the second identification module,
reading the data set from the first identification module,
transmitting the data set read from the first identification module to the second identification module, and
storing the transmitted data set in the second identification module, and
storing the data set read from the first identification module and associated user data or subscriber data including the serial number of the second identification module in a home location register of a mobile radio network.

2. The method according to claim 1, wherein the first identification module contains a plurality of subscriber identifications that are used for starting up and personalizing a plurality of nonpersonalized second identification modules.

3. The method according to claim 1 wherein an originally nonpersonalized identification module can be repersonalized several times after a first personalization, either via the same original first identification module with the same or changed data set, or also via another first identification module.

4. The method according to claim 1 wherein only subscriber identifications of the data set on personalized identification modules are changed.

5. The method according to claim 1 wherein the data set is transmitted via a radio connection or other connection to a read/write device holding the second identification module or is transmitted by a read/write device holding the first identification module as well as the second identification module.

6. The method according to claim 1, further comprising the step before transmitting the data set from the first identification module of
checking or authenticating the serial number of the second identification module or the mobile radio terminal by an equipment identity number by means of which the mobile radio terminal is uniquely identifiable, or
checking security parameters of the second identification module.

7. The method according to claim 1, further comprising the step before transmitting the data set from the first identification module of
checking or authenticating the first identification module.

8. The method according to claim 1, further comprising the step of
storing the serial number of the second identification module in the first identification module.

9. The method according to claim 1, further comprising the step of
storing the date of a performed personalization of a second identification module in the first identification module.

10. The method according to claim 1 wherein the data transmission of the data set from the first identification module to the second identification module is carried out via a secure data connection.

11. The method according to claim 1, further comprising the step after completed receipt and storage of the data set on the second identification module of
transmitting a confirmation to the first identification module or to a mobile radio network.

12. The method according to claim 1, wherein the first or the second identification module is a user identification module or a subscriber identification module for operating a mobile radio terminal.

13. The method according to claim 12, wherein the data set is a subscriber data set of a mobile radio user.

14. A method of starting up and personalizing a further second nonpersonalized identification module, the method comprising the steps of
providing a first identification module,
storing on the first identification module a personalized data set containing one or more unique definitive subscriber identifications,
providing the second identification module,
authenticating or checking the second identification module,
reading the data set from the first identification module,
transmitting the data set read from the first identification module to the second identification module,
storing the transmitted data set in the second identification module, and
transmitting the serial number of the second identification module via the first identification module to a home location register of the mobile radio network and storing the serial number of the second identification module therein.

15. The method according to claim 14, further comprising the step of
storing the data set generated during the personalization and the associated user data or subscriber data, including the serial number of the second identification module in a home location register of a mobile radio network.

* * * * *